Patented May 23, 1939

2,159,854

UNITED STATES PATENT OFFICE 2,159,854

CORROSION-RESISTANT BATTERY TERMINAL

Lionel F. Jourdan and Harold A. Levey, New Orleans, La.

No Drawing. Application July 6, 1937, Serial No. 152,284

9 Claims. (Cl. 136—163)

The present invention relates to the protection of exposed current carrying parts of batteries and other metallic portions of the battery to thereby inhibit corrosion of said elements. The invention is more particularly directed to the protection against corrosion of the battery terminals or exposed electrodes and cables of storage batteries, such as may be particularly adapted for use on automobiles.

In accordance with the present invention, the current carrying parts and the like, and particularly the battery terminals and/or exposed electrodes are provided with a continuous acid-resistant impervious non-tacky adherent coating or film. In the preferred form of the invention, the coating or film is substantially non-inflammable and very slow burning. The coating of the exposed current-carrying parts and the like is also preferably characterized by the property of being non-shrinking when subjected to fairly low temperatures.

More specifically, the current-carrying parts are provided with a coating or film of the character specified comprising a base material, a volatile solvent therefor, preferably, although not necessarily, an organic solvent, said solvent evaporating fairly quickly, as hereinafter more particularly pointed out, from the composition to form a coating or adherent film.

The above ingredients have preferably added thereto a neutralizing agent, the primary function of which is to neutralize the battery acid which condenses on the surface of the coating or film and thereby inhibit corrosion of the metallic surfaces. The neutralizing agent in the preferred form of the invention is, preferably, an organic compound. The base material, as hereinafter set forth, is for the most part not soft enough to form the desired coating or film, and for that reason, it is desired to add to the composition a plasticizing agent. However, said plasticizing agent may be dispensed with if the base material has the desired physical characteristics.

In the most satisfactory form of the invention, the battery terminal and the cable fittings or lugs are provided with a composition in which the neutralizing agent also possesses a plasticizing value on the ultimate film in which it is dissolved.

Stating the above a little more specifically, the base material is a plastic which preferably, although not necessarily, belongs to a series of compounds consisting essentially of highly polymerized hydrocarbons, plastic in nature, fuses at a relatively low temperature, and which when evaporated from its solution in a volatile organic solvent, dries to form a very adherent continuous, substantially impervious non-tack, glossy, acid-resistant film. The neutralizing agent is desirably an organic compound giving a substantially basic reaction or having the capacity of forming a neutral substance with inorganic and organic acids, and simultaneously, is preferably soluble, miscible or compatible with the base material, and soluble in the organic solvent. The volatile organic solvent is desirably an active solvent for the base material and the neutralizing agent. The organic solvent may be a single substance, or a mixture of substances, possessing the above referred-to characteristics, and it is desirable that it have a vapor pressure curve such that its rate of evaporation will permit the hardening of a mixture of the basic material and organic neutralizing agent to form a non-tacky coating composition in a relatively short time. By way of illustration and not by limitation, the vapor pressure of the solvent should be such that the non-tacky coating is formed in less than one-half hour from the time of application of the coating composition, said composition being usually applied by a brush or by spraying. It may be pointed out that by controlling the vapor pressure of the solvent the time of drying can, to a large extent, be controlled. The time of drying may be less or greater than one-half hour, depending on the vapor pressure of the solvent.

The base material is preferably a battery sealing pitch, which is a generic term well known in the art to cover a great many compounds usually composed of plastic polymerized hydrocarbons. Examples of suitable sealing pitches will now be referred to.

In the treatise entitled "Asphalts and Allied Substances" by Herman Abraham; Van Nostrand and Co., page 477, the following appears:

"Battery box compound for sealing consists of moderately hard coal tar pitch fusing at 160–170° F. combined with an equal weight of a silicious filler."

Another sealing pitch is composed of coal tar pitch which has therein from 5% to 40% of stearine pitch. Stearine pitch is the residue which remains in the retorts from which is distilled by vacuum distillation, such free fatty acids as stearic, palmitic, oleic, myristic and the like, such as may be obtained from oleo stearine, lard oil, cottonseed, soya bean oil, corn oil, and the like, after said materials have been hydrolyzed for the recovery of their glycerol content. This residual pitch is a solid, jet black in color, containing free carbon in suspension, and is a highly polymerized condensed residue of a rubbery-like nature, which becomes tacky and flows at slightly elevated temperatures.

The chemical formulary gives a composition for "battery sealing pitch" as follows:

| | Percent |
|---|---|
| Gilsonite | 16 |
| Blown asphalt | 22 |
| Silica powdered | 20 |
| Ground scrap rubber | 15 |
| Ground derubberized tire fabric | 7½ |
| Montan wax | 8 |
| Carbon black | 1½ |

The battery sealing pitch prepared by the Reilly Tar & Chemical Corp. of Indianapolis, Indiana, is made from a blend of pitches obtained from coal tar with a flow point approximating 150° F. Amer. Pet. Inst.

Other materials which may be used as the base material are the pitches obtained from pine, petroleum residues, reclaimed rubber residues, and vegetable and animal oil residiums from distillation. Various natural asphalts are effective as the base material, and among these may be included such types of asphaltums as Egyptian, Barbadoes, Trinidad, Manjak, Elaterite, Grahamite, Albertite, Glance Pitch, Syrian asphalts, shale oil residuum, and the like.

In general, in preparing the base material to meet the characteristics of the composition as set forth in the present disclosure, it will be invariably necessary to use a mixture of one or more substances rather than to expect a single substance to meet all the requirements of the base material.

In general, it may be stated that the desired properties of the base material are obtained, in accordance with the present invention, by compounding through fusion or when dissolved in a mutual solvent a relatively hard substance with a substantially softer, elastic product which possesses a low fusion point, and begins to flow at a temperature range of from 100 to 110° F. The preferred substance, and it may be stated the usual substance, which has been found well performs the latter function, is stearine pitch, which measures up quite closely in both flow characteristics and elasticity necessary to prevent embrittlement of the ultimate coating or film at low temperatures. In the preferred form of the invention, it is desirable that the adhesion characteristics of the ultimate film be enhanced, and the stearine pitch, which is, as above set forth, mixed with another pitch or the like, admirably performs this function, and additionally adds to the acid-resistant properties of the ultimate coating or film.

The neutralizing agent, as above set forth, functions not only to neutralize the battery acid which condenses on its surface from both spray, as well as to a more limited extent creeping from the joint between the electrode terminal and the battery cover, but simultaneously acts as a corrosion inhibiting agent on the metallic surface covered by the battery sealing pitch with which it is mixed.

As herein pointed out, it is desirable that the neutralizing agent have a definite plasticizing value on the ultimate film in which it is dispersed or dissolved. The most satisfactory results have been obtained by using as a neutralizing agent that group of compounds known as the "substituted ammonias" which include the aliphatic and aromatic amines, the acid amides, the imides and the cyclic nitrogen or ring compounds, or compositions containing these substances. However, as hereinafter pointed out, agents which do not form a plasticizing action may be used. In other words, the plasticizer is not necessary if the battery sealed pitch has the desired physical characteristics.

The neutralizing agent preferably should have a low vapor pressure, or it may be volatilized to such an extent that so small a residue would remain as to substantially reduce its effectiveness to neutralize the corrosive action of the acid spray.

Preferably, the neutralizing agent is of an oily and emolient nature and, therefore, it acts as a plasticizer or softening agent for the battery sealing pitch, or base material.

While the neutralizing agent should, for more satisfactory results, be present in the composition in an amount preferably equal to 4% by weight, it may be used in smaller amounts from one-quarter per cent (¼%) up to fifty per cent (50%) of the weight of the dried film. If too small an amount of the neutralizing agent is used, its effectiveness in neutralizing the acid spray is accordingly diminished, and on the other hand, if excessively large amounts are used, the film will not only be slow-drying, but will retain a tacky surface until a considerable portion of this component has evaporated from the film over a term of days or weeks, to thereby permit the film to harden to a non-tacky surface.

In view of the above, it is clear that it is not intended to limit the amount of neutralizing and plasticizing agent to 4%, but this amount may be varied considerably in accordance with the character of the other materials of the composition and the results which it is desired to obtain, and the quickness with which the results are to be obtained.

The volatile solvent should be an active solvent for both the base material or sealing pitch and the neutralizing agent. Preferably, the vapor pressure curve of the solvent should be such that the bulk of its volume may be removed by evaporation from a film applied by brush or spray in less than ½ hour with a prevailing temperature of 70° F. Representative substances of this general type are the petroleum hydrocarbons or mixtures thereof, and these hydrocarbons may range from the hexanes and hexenes to the decanes and decenes, and are designated by such names as ligroin, petroleum ether, petroleum solvent naphtha, aviation gasoline, and motor gasoline. These products may also contain limited amounts of benzine, kerosene, mineral spirits and their equivalents, all well known in the art. Coal tar hydrocarbons, such as benzol (benzene) toluene, xylene, together with the chlorine substituted products of these types of compounds such as methylene dichloride, chloroform, carbon tetrachloride, ethylene dichloride, ethylene trichloride, tetrachlorethane, propyl, butyl and amyl chloride, the mono and dichlorbenzenes, the chlorinated toluenes and xylenes, together with the mixtures of one or more of these compounds. Aldehydes, ketones, ethers and acids which possess the desired solubility reactions for the base material and the neutralizing agent are equally valuable for use as a solvent, if in addition to the solubility element, they also have the preferred evaporative rate. Turpentine and other volatile terpenes within the range of our requirements are also suitable. In view of the low price of the petroleum and coal tar solvents, as well as their effectiveness, these are the preferred organic solvents. However, as stated, suitable mixtures of all types of hydrocarbons and their derivatives possessing the described chemical and physical characteristics are suitable for use in accordance with the present invention.

It may be stated that when the volatile organic acids are used as solvents, a sufficient amount of the neutralizing agent will have to be used to react with the organic acids to form a nitrogen-containing compound, if this be the desired neutralizing agent, or more specifically to form acid amides of the desired properties, and leave an excess of the organic base available to neutralize battery acid spray.

The salient properties of the composition which is to be applied to the battery parts is that the composition should be preferably capable of being applied by a brush or with a spray gun to the terminals. In view of its adherent nature and body, the composition penetrates all of the minute crevices of the electrode and cable terminal forming a continuous, acid-resistant, impervious, non-tacky adherent film, which is distinguishable from the prior art coatings made from vaselines, greases and other tacky and semifluid materials. Compositions of this character which have hitherto been applied to current-carrying parts of the battery, can be readily wiped off, any rigid object passing over the surface of such types of films results in the ready and complete removal of the same from that area of contact, thus subjecting the exposed areas to the drastic corrosive action of the acid spray. Further, such tacky materials accumulate large amounts of dirt, grit and solid foreign matter in general, which makes the surface readily permeable to the corrosive action of the acid spray, which in a short period of time attacks both the battery electrode and the cable terminal.

It may be stated that one of the outstanding advantages of protecting the battery parts with the present composition is the fact that the latter, when properly formulated and due to its thermo-plastic characteristics, results in a self-healing leveling action, the composition thereby functioning to maintain at all times a continuous non-pervious film which permanently protects the surface of the battery parts, including the current-carrying elements, against the acid spray. Further, because of this plastic flow, the composition seeps into the joint between the electrode and the battery box cover, which in use invariably develops a gap, after which the acid electrolyte creeps up the surface of the electrode corroding the same, as well as the battery terminal. The coating composition of the present invention flows into such crevices, sealing the gap to thereby prevent corrosion due to acid creeping. Because of the elastic and non-cracking nature of the composition, the latter acts in a self-healing manner, permanently and effectively closing such crevices to thereby prevent corrosion from this insidious source.

In the preferred form of the invention, most satisfactory results are obtained when the composition consists of about 40% of solids or non-volatile constituents, and 60% of a solvent mixture of volatile constituents. This produces a viscosity or body which is suitable for brush or spray application. In general, it may be stated that these percentages may be considerably varied so long as the composition has a consistency whereby it may be brushed onto the battery parts or sprayed thereon. The solid components may be reduced to 10% by weight, in which case a very thin coating film is provided. This thin film may be increased in thickness by applying an additional coat. Therefore, when the solid components are low, it may be necessary to apply several coats or films to provide the desired corrosion-resistant effect.

When the solids are increased to above 40%, as for example 80% of solids and 20% of volatile compounds, the coating composition may be applied as a putty by means of a spatula or the fingers much as an ointment. This, of course, results in a waste of materials, and further because of the thick film, the coating will take much longer to harden to the desired degree of plasticity. Obviously, in preparing the composition, the type of battery sealing pitch, together with the characteristics of the same, must be considered in formulating the final composition. If a hard pitch is used, it might be plasticized by any of the recognized plasticizing agents such as have been used for cellulose nitrate coatings and similar plastics, all of which are well known in the art. Further, instead of using the organic plasticizers, such as are usually used for plasticizing cellulose nitrate, acetate and the like, the pitch may be plasticized by animal waxes, vegetable waxes or mineral waxes, such as ozokerite, ceresine, paraffin and the like.

In some cases, the percentage of the alkaline or basic organic neutralizing agent may be increased and the excess quantity of the same present may act as a plasticizing agent. If a soft pitch be used, correspondingly smaller amounts of plasticizing or softening agents will be required.

In carrying out the present invention, it is preferable to add moderate amounts of elastic pitches, such as stearin pitch, Balata gum, and polymerized residues, resulting from distilled fatty acids in order to sustain the elasticity of the composition at low temperatures, and thereby prevent cracking which might otherwise result.

The following are illustrative examples of preferred compositions. In these compositions the aniline or amine may be substituted by various compounds of the substituted ammonia class, or other compounds as hereinbefore pointed out, and the solvent may be varied, as more particularly hereinbefore pointed out. The proportions may be varied as previously set forth:

Formula A

| | Percent by weight |
|---|---|
| Battery sealing pitch | 36 |
| Dimethyl aniline | 4 |
| Benzol | 60 |

Formula B

| | Percent by weight |
|---|---|
| Battery sealing pitch | 36 |
| Ethylene diamine | 4 |
| Solvent naphtha | 60 |

Formula C

| | Percent by weight |
|---|---|
| Battery sealing pitch | 36 |
| Tributyl amine | 4 |
| Benzol | 30 |
| Solvent naphtha | 30 |

When the battery sealing pitch has the desired physical characteristics, that is, when it does not need a plasticizer, organic inhibitors of corrosion my be used which do not perform any plasticizing action, such as for example diethyl carbamide, or its near equivalent, urea.

It may be stated that various inhibitors of corrosion which are well known in the art, including the different nitrogen inhibitors of corrosion, may be incorporated in the battery sealing pitch, provided these compounds are soluble, or soluble at least to some extent, in the battery sealing pitch, as well as in the organic solvent.

A great many cyclic organic bases which contain a nitrogen atom in the ring may be used. These compounds are principally derivatives of pyridine, quinoline and acridine. Introduction of amino groups into such compounds increases the inhibiting efficiency.

Stated differently, the substitution products of these compounds, as well as many of the amino acids, may be used, provided they fulfill the requirements set forth.

The oxonium compounds may also be used, and a great many of the oxygen-containing organic inhibitors may be used as the base material. The azonium nitrogen-containing inhibitors are also of value.

We claim:

1. An electric storage battery having external metal parts subject to acid corrosion protected by an adherent acid neutralizing and corrosion-inhibiting coating comprising the product resulting from a mixture of an organic battery sealing base adapted to form an impervious coating and a substantially non-volatile organic acid neutralizing agent soluble in and compatible with the sealing base, and a volatile organic solvent for said base and neutralizing agent.

2. An electric storage battery having external metal current-carrying parts subject to acid corrosion protected by an adherent acid neutralizing and corrosion-inhibiting coating comprising the product resulting from a mixture of an organic battery sealing base adapted to form an impervious coating and a substantially non-volatile organic acid neutralizing agent of the substituted ammonia class soluble in and compatible with the sealing base and a volatile organic solvent for said base and neutralizing agent.

3. An electric storage battery having external metal current-carrying parts protected by an adherent acid neutralizing and corrosion-inhibiting coating comprising the product resulting from a mixture of an organic battery sealing base adapted to form an impervious coating and a substantially non-volatile organic acid neutralizing agent soluble in and compatible with the battery sealing base and also acting as a plasticizer therefor, and a volatile organic solvent for said base and neutralizing agent.

4. An electric storage battery having metal battery parts which are subject to corrosion protected by an adherent acid neutralizing and corrosion-inhibiting coating comprising the product resulting from a mixture of an organic battery sealing base adapted to form an impervious coating and a substantially non-volatile organic acid neutralizing agent soluble in and compatible with the sealing base, and a volatile organic solvent for said base and neutralizing agent, said neutralizing agent being present in a minor proportion and the battery sealing base and volatile solvent being present in a predominating proportion.

5. An electric storage battery having metal battery parts which are subject to corrosion protected by an adherent acid neutralizing and corrosion-inhibiting coating comprising the product resulting from a mixture of an organic battery sealing base adapted to form an impervious coating and a substantially non-volatile organic acid neutralizing agent soluble in and compatible with the sealing base, and a volatile organic solvent for said base and neutralizing agent, said battery sealing base and neutralizing agent being present in a proportion of 40% by weight, and the solvent being present in the proportion of about 60% by weight.

6. An electric storage battery having external metal current-carrying parts protected by a continuous acid-resistant impervious non-tacky adherent coating comprising the product resulting from a plastic mixture of an organic battery sealing base adapted to form from its solution an impervious non-tacky coating, a substantially non-volatile organic acid neutralizing agent, soluble in and compatible with the sealing base, and a volatile organic solvent for said base and neutralizing agent, the latter being present up to about 4% by weight of the mixture.

7. An electric storage battery having external metal current-carrying parts protected by a continuous acid-resistant impervious non-tacky adherent coating comprising the product resulting from a plastic mixture of an organic battery sealing base adapted to form from its solution an impervious non-tacky coating, a substantially non-volatile organic acid neutralizing agent of the substituted ammonia class soluble in and compatible with the sealing base, and a volatile organic solvent for said base and neutralizing agent, the latter being present up to about 4% by weight of the mixture.

8. An electric storage battery having external metal current-carrying parts protected by a continuous acid-resistant impervious non-tacky adherent coating comprising the product resulting from a plastic mixture of an organic battery sealing base adapted to form from its solution an impervious non-tacky coating, a substantially non-volatile organic acid neutralizing agent soluble in and compatible with the sealing base, and a volatile organic solvent for said base and neutralizing agent, the latter being present in amounts varying between ¼ of 1% to 50% on the weight of the dry coating.

9. An electric storage battery having external metal current-carrying parts coated with a battery acid-neutralizing and corrosion-inhibiting coating containing as its essential constituent an organic battery sealing base adapted to form an impervious coating, and a substantially non-volatile organic acid-neutralizing and corrosion-inhibiting agent.

LIONEL F. JOURDAN.
HAROLD A. LEVEY.